United States Patent
Dai et al.

(10) Patent No.: US 8,521,210 B2
(45) Date of Patent: Aug. 27, 2013

(54) TRANSMISSION POWER CONTROL METHOD AND SYSTEM FOR A PHYSICAL UPLINK SHARED CHANNEL

(75) Inventors: Bo Dai, Shenzhen (CN); Peng Hao, Shenzhen (CN); Zhisong Zuo, Shenzhen (CN); Guanghui Yu, Shenzhen (CN); Jin Xu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 257 days.

(21) Appl. No.: 12/991,352

(22) PCT Filed: Jul. 1, 2009

(86) PCT No.: PCT/CN2009/000740
§ 371 (c)(1),
(2), (4) Date: Nov. 5, 2010

(87) PCT Pub. No.: WO2010/078702
PCT Pub. Date: Jul. 15, 2010

(65) Prior Publication Data
US 2011/0059764 A1    Mar. 10, 2011

(30) Foreign Application Priority Data
Jan. 6, 2009 (CN) .......................... 2009 1 0002367

(51) Int. Cl.
*H04B 7/00* (2006.01)

(52) U.S. Cl.
USPC .............. 455/522; 455/69; 455/70; 370/315; 370/316; 370/317; 370/318; 370/319

(58) Field of Classification Search
USPC ...................... 455/522, 69–70; 370/315–320
See application file for complete search history.

(56) References Cited

U.S. PATENT DOCUMENTS

| | | | |
|---|---|---|---|
| 2004/0102205 | A1 | 5/2004 | Zhang |
| 2005/0113127 | A1 | 5/2005 | Zhang |
| 2007/0189224 | A1 | 8/2007 | Usuda et al. |
| 2010/0103891 | A1* | 4/2010 | Okubo et al. ................. 370/329 |
| 2010/0158147 | A1* | 6/2010 | Zhang et al. ................. 375/260 |

FOREIGN PATENT DOCUMENTS

| | | |
|---|---|---|
| CN | 1734967 | 2/2006 |
| CN | 1829111 | 9/2006 |
| CN | 101132203 | 2/2008 |
| CN | 101237260 | 6/2008 |

(Continued)

OTHER PUBLICATIONS

Supplementary European Search Report in European application No. 09837260.0, mailed on Jun. 6, 2012.

(Continued)

*Primary Examiner* — Fayyaz Alam
(74) *Attorney, Agent, or Firm* — Hunton & Williams LLP

(57) ABSTRACT

The present disclosure provides a transmission power control method for a physical uplink shared channel, including: when there is only uplink control information but no uplink shared channel data sent over the physical uplink shared channel, the transmission power of the physical uplink shared channel is set according to the total number of bits contained in a channel quality indication signaling and its corresponding cyclic redundancy check as well as an amplitude offset. The present disclosure also provides a transmission power control system for a physical uplink shared channel. The method and system described in the present disclosure can ensure the overall performance of a system.

18 Claims, 1 Drawing Sheet

(56) References Cited

FOREIGN PATENT DOCUMENTS

| | | |
|---|---|---|
| CN | 101448310 | 6/2009 |
| EP | 1699144 A2 | 9/2006 |
| EP | 1708534 A1 | 10/2006 |
| EP | 1892854 A1 | 2/2008 |
| JP | 2003318821 A | 11/2003 |
| JP | 2008193439 A | 8/2008 |
| RU | 2007101726 A | 7/2008 |

OTHER PUBLICATIONS

International Search Report for International Application No. PCT/CN2009/000740 mailed Oct. 1, 2009.

English Translation of the Written Opinion of the International Search Authority in international application No. PCT/CN2009/000740, mailed on Oct. 1, 2009.

Delta_TF configuration for control only PUSCH Jan. 12, 2009.

* cited by examiner

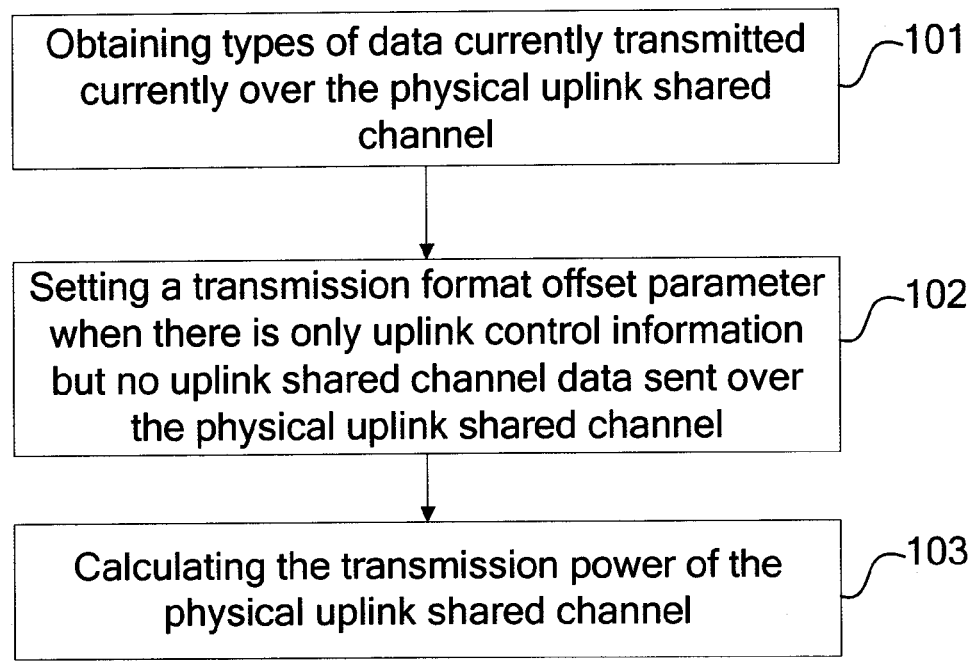

TRANSMISSION POWER CONTROL METHOD AND SYSTEM FOR A PHYSICAL UPLINK SHARED CHANNEL

CROSS-REFERENCE TO RELATED APPLICATIONS

This patent application is a U.S. national phase application of International Patent Application No. PCT/CN2009/000740, filed Jul. 1, 2009, which claims priority to China Patent Application No. 200910002367.6, filed Jan. 6, 2009, each of which is hereby incorporated by reference herein in its entirety.

TECHNICAL FIELD

The present disclosure relates to a communication field, and particularly to a transmission power control method and system for a physical uplink shared channel.

BACKGROUND

In a LTE (Long Term Evolution) system, physical uplink channels mainly include a PUCCH (Physical Uplink Control Channel) and a PUSCH (Physical Uplink Shared Channel) and so on. The PUCCH is used for transmitting uplink control information, which includes uplink feedback such as ACK (Acknowledge)/NACK (Non-Acknowledge), CQI (Channel Quality Indication), RI (Rank Indication), and PMI (Precoding Matrix Indicator) and so on. PUSCH may only transmit Uplink Shared Channel (UL-SCH) data or may only transmit uplink control information, or may transmit both uplink shared channel data and uplink control information.

All User Equipments (UE) in a cell need to set transmission power of a physical uplink shared channel in every subframe. In an adjustment process of uplink closed loop power control, for a certain subframe i, the setting formula (or called as a power control formula, hereinafter referred to as formula 1) for the transmission power of its physical uplink shared channel (take dBm as a unit) is:

$$P_{PUSCH}(i) = \min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i, that is the number of resource blocks used for transmitting the PUSCH in subframe i;

$P_{O\_PUSCH}(j)$ represents target reference power. For the specific definition of variable j, please refer to relative standard documents of LTE, such as the definition in section 5.1.1.1 of TS 36.213 (LTE physical layer);

α represents a path loss correction factor;

PL represents path loss;

$\Delta_{TF}(i)$ represents a transmission format offset parameter, wherein

When $K_S = 1.25$, $\Delta_{TF}(i) = 10 \cdot \log_{10}(2^{MPR \cdot K_S} - 1)$; when $K_S = 0$, $\Delta_{TF}(i) = 0$;

$K_S$ is a parameter configured by RRC (Radio Resource Control) at a high layer; $MPR = TBS/N_{RE}$, where TBS represents the size of a transmission block; $N_{RE}$ represents the number of resource elements, $N_{RE} = M_{PUSCH} \cdot N_{sc}^{RB} \cdot N_{symb}^{PUSCH}$, $M_{PUSCH}$ represents the bandwidth used for transmitting the physical uplink shared channel, $N_{symb}^{PUSCH}$ represents the number of SC-FDMA (Single Carrier-Frequency Division Multiple Access) symbols used for transmitting the PUSCH; $N_{sc}^{RB}$ represents the number of subcarriers (resource elements) contained in a resource block, which is used for representing the size of a resource block in a frequency domain. TBS and $M_{PUSCH}$ can be obtained according to a signaling in an initial PDCCH of a transmission block;

f(i) represents the power control correction function of subframe i.

As TBS represents the size of a transmission block, when there is only uplink control information but no uplink shared channel data sent over a physical uplink shared channel, the size of a transmission block is 0, that is TBS=0, then, $$\Delta_{TF}(i) = 10 \cdot \log_{10}(2^{MPR \cdot K_S} - 1) = 10 \times \log_{10}(2^{0 \times 1.25} - 1) = 10 \times \log_{10} 0,$$

where $\Delta_{TF}(i)$ is an infinite value, which is meaningless; this can lead to troubles in system realization. When there is only uplink control information but no uplink shared channel data sent over a physical uplink shared channel, the power control of the physical uplink shared channel can not be realized, the transmission performance of uplink control information can be affected, and thereby the overall performance of a system can be caused to decline.

SUMMARY

The technical problem to be solved by the present disclosure is to overcome the shortcomings of the existing technology by providing a transmission power control method and a system for a PUSCH when there is only uplink control information but no uplink shared channel data sent over the physical uplink shared channel, thus to ensure the overall performance of a system.

To solve the problem as above, the present disclosure provides a transmission power control method for a physical uplink shared channel. The method includes: when there is only uplink control information but no uplink shared channel data sent over the physical uplink shared channel, the transmission power of the physical uplink shared channel is set according to the total number of bits contained in a channel quality indication signaling and its corresponding cyclic redundancy check as well as amplitude offset.

Further, the aforesaid method may also have the following characteristic, the transmission power of the physical uplink shared channel is set according to the following formula:

$$P_{PUSCH}(i) = \min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the physical uplink shared channel in subframe i;

$P_{O\_PUSCH}(j)$ represents target reference power;

α represents a path loss correction factor;

PL represents path loss;

f(i) represents a power control correction function of subframe i;

$\Delta_{TF}(i)$ is a transmission format offset parameter;

When $K_S = 1.25$, $\Delta_{TF}(i) = 10 \cdot \log_{10}((2^{MPR \cdot K_S} - 1) \cdot \Delta\beta)$, or $\Delta_{TF}(i) = 10 \cdot \log_{10}(2^{MPR \cdot K_S} - 1) + \Delta\beta$; when $K_S = 0$, $\Delta_{TF}(i) = 0$; $K_S$ is a parameter configured by radio resource control at a high layer; $MPR = O/N_{RE}$, where $N_{RE}$ represents the number of resource elements, $N_{RE} = M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access (SC-FDMA) symbols used for transmitting the PUSCH, $N_{sc}^{RB}$ represents the number of resource elements contained in a resource block, O represents the size of information bits, and $\Delta\beta$ represents the amplitude offset;

wherein when there is only uplink control information but no uplink shared channel data sent over the physical uplink shared channel, $O=O_{CQI}$, and when $\Delta_{TF}(i)=10\cdot\log_{10}\{(2^{MPR\cdot K_s}-1)\cdot\Delta\beta\}$, $\Delta\beta=\beta_{offset}^{CQI}$, or when $\Delta_{TF}(i)=10\cdot\log_{10}(2^{MPR\cdot K_s}-1)+\Delta\beta$, $\Delta\beta=10\cdot\log_{10}\beta_{offset}^{CQI}$, where $O_{CQI}$ represents the total number of bits contained in the channel quality indication signaling and its corresponding cyclic redundancy check, $\beta_{offset}^{CQI}$ represents an amplitude offset of channel quality indication information, and $M_{PUSCH}$ is obtained according to a signaling in an initial PDCCH of a transmission block.

Further, the aforesaid method may have the following characteristic, the $\beta_{offset}^{CQI}$ is notified by a high layer signaling.

Further, the aforesaid method may also have the following characteristic, the value of $\beta_{offset}^{CQI}$ may be 0.750, 1.000, 1.125, 1.250, 1.375, 1.625, 1.750, 2.000, 2.250, 2.500, 2.875, 3.125, 3.500, 4.000, 5.000 or 6.250.

Further, the aforesaid method may also have the following characteristic, when there is only uplink shared channel data sent over the physical uplink shared channel, or when there are both uplink control information and uplink shared channel data sent over the physical uplink shared channel, O=TBS, when $\Delta_{TF}(i)=10\cdot\log_{10}\{(2^{MPR\cdot K_s}-1)\cdot\Delta\beta\}$, $\Delta\beta=1$, or when $\Delta_{TF}(i)=10\cdot\log_{10}(2^{MPR\cdot K_s}-1)+\Delta\beta$, $\Delta\beta=0$, where TBS represents the size of a transmission block, and TBS and $M_{PUSCH}$ are obtained according to the signaling in the initial PDCCH of the transmission block.

Further, the aforesaid method may also have the following characteristic, when there is only uplink shared channel data sent over the physical uplink shared channel, O=TBS, when $\Delta_{TF}(i)=10\cdot\log_{10}\{(2^{MPR\cdot K_s}-1)\cdot\Delta\beta\}$, $\Delta\beta=1$, or when $\Delta_{TF}(i)=10\cdot\log_{10}(2^{MPR\cdot K_s}-1)+\Delta\beta$, $\Delta\beta=0$, where TBS represents the size of a transmission block, and TBS and $M_{PUSCH}$ are obtained according to a signaling in a most recent PDCCH related to the transmission block.

Further, the aforesaid method may also have the following characteristic, when there is only uplink shared channel data sent over the physical uplink shared channel, or when there are both uplink control information and uplink shared channel data sent over the physical uplink shared channel, $$O=\sum_{r=0}^{C-1} K_r;$$

when $\Delta_{TF}(i)=10\cdot\log_{10}\{(2^{MPR\cdot K_s}-1)\cdot\Delta\beta\}$, $\Delta\beta=1$, or when $\Delta_{TF}(i)=10\cdot\log_{10}(2^{MPR\cdot K_s}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to the signaling in the initial PDCCH of the transmission block.

Further, the aforesaid method may also have the following characteristic, when there is only uplink shared channel data sent over the physical uplink shared channel, $$O=\sum_{r=0}^{C-1} K_r$$

when $\Delta_{TF}(i)=10\cdot\log_{10}\{(2^{MPR\cdot K_s}-1)\cdot\Delta\beta\}$, $\Delta\beta=1$, or when $\Delta_{TF}(i)=10\cdot\log_{10}(2^{MPR\cdot K_s}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to a signaling in a most recent PDCCH related to the transmission block.

Further, the aforesaid may also have the following characteristic, the uplink control information includes: Acknowledgment (ACK), and/or Non-Acknowledge (NACK), and/or Rank Indication (RI), Channel Quality Indication (CQI), and/or Precoding Matrix Indicator (PMI).

The present disclosure also provides a transmission power control system for a physical uplink shared channel. The system includes: a power setting module, used for setting the transmission power of the physical uplink shared channel according to the total number of bits contained in a channel quality indication signaling and its corresponding cyclic redundancy check as well as an amplitude offset, when there is only uplink control information but no uplink shared channel data sent over the physical uplink shared channel.

Further, the aforesaid system may have the following characteristic, the power setting module is used for setting the transmission power of the physical uplink shared channel according to the following formula:

$$P_{PUSCH}(i)=\min\{P_{MAX}, 10\cdot\log_{10}(M_{PUSCH}(i))+P_{O\_PUSCH}(j)+\alpha\cdot PL+\Delta_{TF}(i)+f(i)\},$$

where $P_{MAX}$ represents an upper limit of transmission power;

$M_{PUSCH}(i)$ represents bandwidth used for transmitting the physical uplink shared channel in subframe i;

$P_{O\_PUSCH}(j)$ represents target reference power;

$\alpha$ represents a path loss correction factor;

PL represents path loss;

f(i) represents a power control correction function of subframe i;

$\Delta_{TF}(i)$ is a transmission format offset parameter;

When $K_s=1.25$, $\Delta_{TF}(i)=10\cdot\log_{10}\{(2^{MPR\cdot K_s}-1)\cdot\Delta\beta\}$, or $\Delta_{TF}(i)=10\cdot\log_{10}(2^{MPR\cdot K_s}-1)+\Delta\beta$; when $K_s=0$, $\Delta_{TF}(i)=0$; $K_s$ is a parameter configured by radio resource control at a high layer; $MPR=O/N_{RE}$, where $N_{RE}$ represents the number of resource elements, $N_{RE}=M_{PUSCH}\cdot N_{sc}^{RB}\cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents the amplitude offset;

wherein when there is only uplink control information but no uplink shared channel data sent over the physical uplink shared channel, $O=O_{CQI}$, and when $\Delta_{TF}(i)=10\cdot\log_{10}\{(2^{MPR\cdot K_s}-1)\cdot\Delta\beta\}$, $\Delta\beta=\beta_{offset}^{CQI}$, or when $\Delta_{TF}(i)=10\cdot\log_{10}(2^{MPR\cdot K_s}-1)+\Delta\beta$, $\Delta\beta=10\cdot\log_{10}\beta_{offset}^{CQI}$, where $O_{CQI}$ represents the total number of bits contained in channel quality indication signaling and its corresponding cyclic redundancy check, $\beta_{offset}^{CQI}$ represents an amplitude offset of channel quality indication information, and $M_{PUSCH}$ is obtained according to a signaling in an initial PDCCH of a transmission block.

Further, the aforesaid system may have the following characteristic, the power setting module is used for obtaining the $\beta_{offset}^{CQI}$ from a high layer signaling.

Further, the said system may have the following characteristic, the power setting module is used for determining values of the O and $\Delta\beta$ in the following way when there is only uplink shared channel data sent over the physical uplink shared channel, or when there are both uplink control information and uplink shared channel data sent over the physical uplink shared channel: O=TBS, when $\Delta_{TF}(i)=$ $10 \cdot \log_{10}\{(2^{MPR \cdot K_S}-1) \cdot \Delta\beta\}$, $\Delta\beta=1$, or when $\Delta_{TF}(i)=10 \cdot \log_{10}(2^{MPR \cdot K_S}-1)+\Delta\beta$, $\Delta\beta=0$, where TBS represents the size of a transmission block, and TBS and $M_{PUSCH}$ are obtained according to the signaling in the initial PDCCH of the transmission block.

Further, the aforesaid system may have the following characteristic, the power setting module is used for determining values of O and $\Delta\beta$ in the following way when there is only uplink shared channel data sent over the physical uplink shared channel: O=TBS, when $\Delta_{TF}(i)=10 \cdot \log_{10}\{(2^{MPR \cdot K_S}-1) \cdot \Delta\beta\}$, $\Delta\beta=1$, or when $\Delta_{TF}(i)=10 \cdot \log_{10}(2^{MPR \cdot K_S}-1)+\Delta\beta$, $\Delta\beta=0$, where TBS represents the size of a transmission block, and TBS and $M_{PUSCH}$ are obtained according to a signaling in a most recent PDCCH related to the transmission block.

Further, the aforesaid system may have the following characteristic, the power setting module is used for determining values of O and $\Delta\beta$ in the following way when there is only uplink shared channel data sent over the physical uplink shared channel, or when there are both uplink control information and uplink shared channel data sent over the physical uplink shared channel:

$$O = \sum_{r=0}^{C-1} K_r,$$

when $\Delta_{TF}(i)=10 \cdot \log_{10}\{(2^{MPR \cdot K_S}-1) \cdot \Delta\beta\}$, $\Delta\beta=1$, or when $\Delta_{TF}(i)=10 \cdot \log_{10}(2^{MPR \cdot K_S}-1)+\Delta\beta$, $\Delta\beta=0$, where C represents the total number of coding blocks, $K_r$ represents the number of bits contained in a coking block with an index of r, and the $M_{PUSCH}$, C and $K_r$ are obtained according to the signaling in the initial PDCCH of the transmission block.

Further, the aforesaid system may have the following characteristic, the power setting module is used for determining values of O and $\Delta\beta$ in the following way when there is only uplink shared channel data sent over the physical uplink shared channel:

$$O = \sum_{r=0}^{C-1} K_r,$$

when $\Delta_{TF}(i)=10 \cdot \log_{10}\{(2^{MPR \cdot K_S}-1) \cdot \Delta\beta\}$, $\Delta\beta=1$, or when $\Delta_{TF}(i)=10 \cdot \log_{10}(2^{MPR \cdot K_S}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to a signaling in a most recent PDCCH related to the transmission block.

The present disclosure provides a transmission power control method and a system for a physical uplink shared channel to solve the problem of power control of the physical uplink shared channel when there is only uplink control information but no uplink shared channel data sent over the physical uplink shared channel, thus to ensure the overall performance of a system.

BRIEF DESCRIPTION OF THE DRAWINGS

FIG. 1 is the flow chart for calculating the transmission power of a physical uplink shared channel when there is only uplink control information but no uplink shared channel data sent over a physical uplink shared channel in the embodiments of the present disclosure.

DETAILED DESCRIPTION

The basic thought of the present disclosure is that, when there is only uplink control information but no uplink shared channel data sent over a physical uplink shared channel, a transmission format offset parameter is set according to the total number of bits contained in a channel quality indication signaling and its corresponding Cyclic Redundancy Check (CRC) as well as an amplitude offset, and then the transmission power of a physical uplink shared channel is set according to the transmission format offset parameter.

As shown in FIG. 1, a transmission power control method for a physical uplink shared channel in accordance with an embodiment of the present disclosure includes the following steps:

step 101: Obtaining types of data currently transmitted over the physical uplink shared channel;

step 102: Setting a transmission format offset parameter when there is only uplink control information but no uplink shared channel data sent over the physical uplink shared channel;

step 103: Calculating the transmission power of the physical uplink shared channel, and setting the transmission power of the physical uplink shared channel according to the result of the calculation.

In step 102, the transmission format offset parameter is set according to the total number of bits contained in a channel quality indication signaling and its corresponding cyclic redundancy check as well as an amplitude offset; in step 103, the transmission power of the physical uplink shared channel is set according to the transmission format offset parameter.

Embodiment 1

The formula for calculating the transmission power of a physical uplink shared channel is as follows:

$$P_{PUSCH}(i) = \min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

$\alpha$ represents a path loss correction factor;

PL represents path loss;

$\Delta_{TF}(i)$ is called as a transmission format offset parameter. When $K_S=1.25$, $\Delta_{TF}(i)=10 \cdot \log_{10}\{(2^{MPR \cdot K_S}-1) \cdot \Delta\beta\}$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

In other cases (when there is only uplink shared channel data sent over the physical uplink shared channel, or when there are both uplink control information and uplink shared channel data sent over the physical uplink shared channel), O=TBS and Δβ=1, where TBS represents the size of a transmission block, TBS and $M_{PUSCH}$ are obtained according to a signaling in an initial PDCCH of the transmission block.

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high level index $I_{offset}^{CQI}$ and $\beta_{offset}^{CQI}$ is not limited to that as shown in Table 1, and may be in other ways.

TABLE 1

Correspondence between the high layer index $I_{offset}^{CQI}$ and $\beta_{offset}^{CQI}$

| $I_{offset}^{CQI}$ | $\beta_{offset}^{CQI}$ |
|---|---|
| 0 | 0.750 |
| 1 | 1.000 |
| 2 | 1.125 |
| 3 | 1.250 |
| 4 | 1.375 |
| 5 | 1.625 |
| 6 | 1.750 |
| 7 | 2.000 |
| 8 | 2.250 |
| 9 | 2.500 |
| 10 | 2.875 |
| 11 | 3.125 |
| 12 | 3.500 |
| 13 | 4.000 |
| 14 | 5.000 |
| 15 | 6.250 | f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 2

The formula for calculating the transmission power of a physical uplink shared channel is shown as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of the transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=10 \cdot \log_{10}\{(2^{MPR \cdot K_S}-1) \cdot \Delta\beta\}$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and Δβ represents an amplitude offset.

When there is only uplink control information but no uplink shared channel data sent over the physical uplink shared channel, $O=O_{CQI}$ and $\Delta\beta=\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

When there are both uplink control information and uplink shared channel data sent over the physical uplink shared channel, O=TBS and Δβ=1, where TBS represents the size of a transmission block, and TBS and $M_{PUSCH}$ are obtained according to a signaling in an initial PDCCH of the transmission block.

When there is only uplink shared channel data sent over the physical uplink shared channel, O=TBS and Δβ=1, where TBS represents the size of a transmission block, and TBS and $M_{PUSCH}$ are obtained according to a signaling in a most recent PDCCH related to the transmission block.

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high layer index $I_{offset}^{CQI}$ and $\beta_{offset}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 3

The formula for calculating the transmission power of a physical uplink shared channel is as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=10 \cdot \log_{10}\{(2^{MPR \cdot K_S}-1) \cdot \Delta\beta\}$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and Δβ represents an amplitude offset.

When there is only uplink control information but no uplink shared channel data sent over the physical uplink shared channel, $O=O_{CQI}$ and $\Delta\beta=\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

In other cases (when there are both uplink control information and uplink shared channel data sent over the physical uplink shard channel, or when there is only uplink shared channel data sent over the physical uplink shared channel), $$O = \sum_{r=0}^{C-1} K_r$$

and $\Delta\beta=1$, where C represents the total number of coding blocks, $K_r$ represents the number of bits contained in a coding block with an index of r, and $M_{PUSCH}$, C and $K_r$ are obtained according to a signaling in an initial PDCCH of a transmission block.

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high layer index $I_{offset}^{CQI}$ and $\beta_{offset}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 4

The formula for calculating the transmission power of a physical uplink shared channel is as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=10 \cdot \log_{10}((2^{MPR \cdot K_S}-1) \cdot \Delta\beta)$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

When there are both uplink control information and uplink shared channel data sent over the physical uplink shared channel, $$O = \sum_{r=0}^{C-1} K_r$$

and $\Delta\beta=1$, where C represents the total number of coding blocks, $K_r$ represents the number of bits contained in a coding block with an index of r, and $M_{PUSCH}$, C and $K_r$ are obtained according to a signaling in an initial PDCCH of a transmission block.

When there is only uplink shared channel data sent over the physical uplink shared channel, $$O = \sum_{r=0}^{C-1} K_r$$

and $\Delta\beta=1$, where C represents the total number of coding blocks, $K_r$ represents the number of bits contained in a coding block with an index of r, and $M_{PUSCH}$, C and $K_r$ are obtained according to a signaling in a most recent PDCCH related to the transmission block.

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high layer index $I_{offset}^{CQI}$ and $\beta_{offset}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 5

The formula for calculating the transmission power of a physical uplink shared channel is as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=\mathbf{10} \cdot \log_{10}(2^{MPR \cdot K_S}-1)+\Delta\beta$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=10 \cdot \log_{10}\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

In other cases (when there is only uplink shared channel data sent over the physical uplink shared channel, or when there are both uplink control information and uplink shared channel data sent over the physical uplink shared channel), $O=TBS$ and $\Delta\beta=0$, where TBS represents the size of a transmission block, and TBS and $M_{PUSCH}$ are obtained according to a signaling in an initial PDCCH of the transmission block.

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high layer index $I_{offset}^{CQI}$ and $\beta_{offset}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 6

The formula for calculating the transmission power of a physical uplink shared channel is as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=10 \cdot \log_{10}(2^{MPR \cdot K_S}-1)+\Delta\beta$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=10 \cdot \log_{10}\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

When there are both uplink control information and uplink shared channel data sent over the physical uplink shared channel, $O=TBS$ and $\Delta\beta=0$, where TBS represents the size of a transmission block, and TBS and $M_{PUSCH}$ are obtained according to a signaling in an initial PDCCH of the transmission block.

When there is only uplink shared channel data sent over the physical uplink shared channel, $O=TBS$ and $\Delta\beta=0$, where TBS represents the size of a transmission block, and TBS and $M_{PUSCH}$ are obtained according to a signaling in a most recent PDCCH related to the transmission block;

$\beta_{offset}^{CQI}$ represents the amplitude offset of channel quality indication information, which is notified by a high layer index $I_{offset}^{CQI}$. The correspondence between the high layer index $I_{offset}^{CQI}$ and $\beta_{offset}^{CQI}$ is shown in Table 1. However, in the present disclosure, the correspondence between the high layer index $I_{offset}^{CQI}$ and $\beta_{offset}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 7

The formula for calculating the transmission power of a physical uplink shared channel is as follows:

$$P_{PUSCH}(i)=\min\{P_{MAX}, 10 \cdot \log_{10}(M_{PUSCH}(i)) + P_{O\_PUSCH}(j) + \alpha \cdot PL + \Delta_{TF}(i) + f(i)\},$$

where $P_{MAX}$ represents an upper limit of transmission power;

$M_{PUSCH}(i)$ represents bandwidth used for transmitting the PUSCH in subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter. When $K_S=1.25$, $\Delta_{TF}(i)=10 \cdot \log_{10}(2^{MPR \cdot K_S}-1)+\Delta\beta$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=10 \cdot \log_{10}\beta_{offset}^{CQI}$, where $O_{CQI}$ represents the total number of bits contained in a channel quality indication signaling and its corresponding cyclic redundancy check, $\beta_{offset}^{CQI}$ represents an amplitude offset of channel quality indication information, which is notified by a high layer signaling, and $M_{PUSCH}$ is obtained according to a signaling in an initial PDCCH of a transmission block.

In other cases (when there are both uplink control information and uplink shared channel data sent over the physical uplink shared channel, or when there is only uplink shared channel data sent over the physical uplink shared channel), $$O = \sum_{r=0}^{C-1} K_r$$

and $\Delta\beta=0$, where C represents the total number of coding blocks, $K_r$ represents the number of bits contained in a coding block with an index of r, and $M_{PUSCH}$, C and $K_r$ are obtained according to a signaling in an initial PDCCH of a transmission block.

$\beta_{offset}{}^{CQI}$ represents the amplitude offset of channel quality indication information, which is notified by a high layer index $I_{offset}{}^{CQI}$. The correspondence between the high layer index $I_{offset}{}^{CQI}$ and $\beta_{offset}{}^{CQI}$ is shown in Table 1. However, in the present disclosure, the correspondence between the high layer index $I_{offset}{}^{CQI}$ and $\beta_{offset}{}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

Embodiment 8

The formula for calculating the transmission power of a physical uplink shared channel is as follows:

$$P_{PUSCH}(i)=\min\{P_{MAX}, 10\cdot\log_{10}(M_{PUSCH}(i))+P_{O\_PUSCH}(j)+\alpha\cdot PL+\Delta_{TF}(i)+f(i)\},$$

where $P_{MAX}$ represents an upper limit of transmission power;

$M_{PUSCH}(i)$ represents bandwidth used for transmitting the PUSCH in the subframe i;

$P_{O\_PUSCH}(j)$ represents target reference power (For specific definition, please refer to the definition in section 5.1.1.1 of TS 36.213 (LTE physical layer));

α represents a path loss correction factor;

PL represents path loss;

$\Delta_{TF}(i)$ is called as a transmission format offset parameter.

When $K_S=1.25$, $\Delta_{TF}(i)=10\cdot\log_{10}(2^{MPR\cdot K_S}-1)+\Delta\beta$; when $K_S=0$, $\Delta_{TF}(i)=0$; $K_S$ is a parameter configured by radio resource control at a high layer; $MPR=O/N_{RE}$, where $N_{RE}$ represents the number of resource elements, $N_{RE}=M_{PUSCH}\cdot N_{sc}{}^{RB}\cdot N_{symb}{}^{PUSCH}$, where $M_{PUSCH}$ represents the bandwidth used for transmitting the physical uplink shared channel, $N_{symb}{}^{PUSCH}$ represents the number of single carrier-frequency division multiple access symbols used for transmitting the PUSCH; $N_{sc}{}^{RB}$ represents the number of resource elements contained in a resource block, O represents the size of information bits, and $\Delta\beta$ represents an amplitude offset.

When there is only uplink control information but no uplink shared channel data sent over the physical uplink shared channel, $O=O_{CQI}$ and $\Delta\beta=10\cdot\log_{10}\beta_{offset}{}^{CQI}$, where $O_{CQI}$ represents the total number of bits contained in a channel quality indication signaling and its corresponding cyclic redundancy check, $\beta_{offset}{}^{CQI}$ represents an amplitude offset of channel quality indication information, which is notified by a high layer signaling, and $M_{PUSCH}$ is obtained according to a signaling in an initial PDCCH of a transmission block.

Where there are both uplink control information and uplink shared channel data sent over the physical uplink shared channel, $$O = \sum_{r=0}^{C-1} K_r$$

and $\Delta\beta=0$, where C represents the total number of coding blocks, $K_r$ represents the number of bits contained in a coding block with an index of r, and $M_{PUSCH}$, C and $K_r$ are obtained according to a signaling in an initial PDCCH of a transmission block.

When there is only uplink shared channel data sent over the physical uplink shared channel, $$O = \sum_{r=0}^{C-1} K_r$$

and $\Delta\beta=0$, where C represents the total number of coding blocks, $K_r$ represents the number of bits contained in a coding block with an index of r, and $M_{PUSCH}$, C and $K_r$ are obtained according to a signaling in a most recent PDCCH related to the transmission block.

$\beta_{offset}{}^{CQI}$ represents the amplitude offset of channel quality indication information, which is notified by a high layer index $I_{offset}{}^{CQI}$. The correspondence between the high layer index $I_{offset}{}^{CQI}$ and $\beta_{offset}{}^{CQI}$ is shown in Table 1. However, in the present disclosure, the correspondence between the high layer index $I_{offset}{}^{CQI}$ and $\beta_{offset}{}^{CQI}$ is not limited to that as shown in Table 1, and may be in other ways.

f(i) represents a power control correction function of subframe i.

Moreover, the uplink control information includes: Acknowledge (ACK), and/or Non-Acknowledge (NACK), and/or Rank Indication (RI), Channel Quality Indication (CQI), and/or Precoding Matrix Indicator (PMI).

The present disclosure also provides a transmission power control system for a physical uplink shared channel. The system includes: a power setting module, used for setting the transmission power of the physical uplink shared channel according to the total number of bits contained In a channel quality indication signaling and its corresponding cyclic redundancy check as well as an amplitude offset, when there is only uplink control information but no uplink shared channel data sent over the physical uplink shared channel.

Wherein the power setting module is used for setting the transmission power of the physical uplink shared channel according to the following formula:

$$P_{PUSCH}(i)=\min\{P_{MAX}, 10\cdot\log_{10}(M_{PUSCH}(i))+P_{O\_PUSCH}(j)+\alpha\cdot PL+\Delta_{TF}(i)+f(i)\},$$

where $P_{MAX}$ represents an upper limit of transmission power;

$M_{PUSCH}(i)$ represents bandwidth used for transmitting the physical uplink shared channel in subframe i;

$P_{O\_PUSCH}(j)$ represents target reference power;

α represents a path loss correction factor;

PL represents path loss;

f(i) represents a power control correction function of subframe i;

$\Delta_{TF}(i)$ is a transmission format offset parameter;

when $K_S=1.25$, , $\Delta_{TF}(i)=10\cdot\log_{10}\{(2^{MPR\cdot K_S}-1)\cdot\Delta\beta\}$; or $\Delta_{TF}(i)=10\cdot\log_{10}(2^{MPR\cdot K_S}-1)+\Delta\beta$; when $K_S=0$, $\Delta_{TF}(i)=0$; $K_S$ is a parameter configured by radio resource control at a high layer; MPR=O/$N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ the number of resource elements contained in a resource block, O represents the size of information bits, and $\Delta\beta$ represents the amplitude offset;

wherein when there is only uplink control information but no uplink shared channel data sent over the physical uplink shared channel, $O=O_{CQI}$, and when $\Delta_{TF}(i)=10 \cdot \log_{10}((2^{MPR \cdot K_s}-1) \cdot \Delta\beta)$, $\Delta\beta=\beta_{offset}^{CQI}$, or when $\Delta_{TF}(i)=10 \cdot \log_{10}(2^{MPR \cdot K_s}-1)+\Delta\beta$, $\Delta\beta=10 \cdot \log_{10}\beta_{offset}^{CQI}$, where $O_{CQI}$ represents the total number of bits contained in the channel quality indication signaling and its corresponding cyclic redundancy check, $\beta_{offset}^{CQI}$ represents an amplitude offset of channel quality indication information, and $M_{PUSCH}$ is obtained according to a signaling in an initial PDCCH of a transmission block. The power setting module obtains the $\beta_{offset}^{CQI}$ from a high layer signaling.

The power setting module is also used for determining values of O and $\Delta\beta$ in the following way when there is only uplink shared channel data sent over the physical uplink shared channel, or when there are both uplink control information and uplink shared channel data sent over the physical uplink shared channel: O=TBS, when $\Delta_{TF}(i)=10 \cdot \log_{10}((2^{MPR \cdot K_s}-1) \cdot \Delta\beta)$, $\Delta\beta=1$, or when $\Delta_{TF}(i)=10 \cdot \log_{10}(2^{MPR \cdot K_s}-1)+\Delta\beta$, $\Delta\beta=0$, where TBS represents the size of a transmission block, and TBS and $M_{PUSCH}$ are obtained according to the signaling in the initial PDCCH of the transmission block.

The power setting module is also used for determining values of O and $\Delta\beta$ in the following way when there is only uplink shared channel data sent over the physical uplink shared channel: O=TBS, when $\Delta_{TF}(i)=10 \cdot \log_{10}((2^{MPR \cdot K_s}-1) \cdot \Delta\beta)$, $\Delta\beta=1$, or when $\Delta_{TF}(i)=10 \cdot \log_{10}(2^{MPR \cdot K_s}-1)+\Delta\beta$, $\Delta\beta=0$, where TBS represents the size of a transmission block, and TBS and $M_{PUSCH}$ are obtained according to a signaling in a most recent PDCCH related to the transmission block.

The power setting module is also used for determining values of O and $\Delta\beta$ in the following way when there is only uplink shared channel data sent over the physical uplink shared channel, or when there are both uplink control information and uplink shared channel data sent over the physical uplink shared channel:

$$O = \sum_{r=0}^{C-1} K_r,$$

when $\Delta_{TF}(i)=10 \cdot \log_{10}((2^{MPR \cdot K_s}-1) \cdot \Delta\beta)$, $\Delta\beta=1$, or when $\Delta_{TF}(i)=10 \cdot \log_{10}(2^{MPR \cdot K_s}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to the signaling in the initial PDCCH of the transmission block.

The power setting module is also used for determining values of O and $\Delta\beta$ in the following way when there is only uplink shared channel data sent over the physical uplink shared channel:

$$O = \sum_{r=0}^{C-1} K_r,$$

when $\Delta_{TF}(i)=10 \cdot \log_{10}((2^{MPR \cdot K_s}-1) \cdot \Delta\beta)$, $\Delta\beta=1$, or when $\Delta_{TF}(i)=10 \cdot \log_{10}(2^{MPR \cdot K_s}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to a signaling in a most recent PDCCH related to the transmission block.

The foregoing descriptions are only preferred embodiments of the present disclosure, and are not intended to limit the present disclosure. For those skilled in the art, the present disclosure may have various changes and modifications. All modifications, identical replacements and improvements made without departing from the spirit and principle of the present disclosure shall be within the protection scope of the present disclosure.

INDUSTRIAL APPLICABILITY

The present disclosure provides a transmission power control method and a system for a physical uplink shared channel, which are used for setting the transmission power of the physical uplink shared channel according to the total number of bits contained in a channel indication signaling and its corresponding cyclic redundancy check as well as an amplitude offset when there is only uplink control information but no uplink shared channel data sent over the physical uplink shared channel, thus to ensure the overall performance of a system.

The invention claimed is:

1. A transmission power control method for a physical uplink shared channel, including: when there is only uplink control information but no uplink shared channel data sent over the physical uplink shared channel, setting the transmission power of the physical uplink shared channel according to the total number of bits contained in a channel quality indication signaling and its corresponding cyclic redundancy check as well as an amplitude offset.

2. The method according to claim 1, wherein the transmission power of the physical uplink shared channel is set according to the following formula:

$$P_{PUSCH}(i)=\min\{P_{MAX}, 10 \cdot \log_{10}(M_{PUSCH}(i))+ P_{O\_PUSCH}(j)+\alpha \cdot PL+\Delta_{TF}(i)+f(i)\},$$

where $P_{MAX}$ represents an upper limit of transmission power;
$M_{PUSCH}(i)$ represents bandwidth used for transmitting the physical uplink shared channel in subframe i;
$P_{O\_PUSCH}(j)$ represents target reference power;
$\alpha$ represents a path loss correction factor;
PL represents path loss;
f(i) represents a power control correction function of subframe i;
$\Delta_{TF}(i)$ is a transmission format offset parameter;
when $K_S=1.25$, $\Delta_{TF}(i)=10 \cdot \log_{10}((2^{MPR \cdot K_s}-1) \cdot \Delta\beta)$ or $\Delta_{TF}(i)=10 \cdot \log_{10}(2^{MPR \cdot K_s}-1)+\Delta\beta$;
when $K_S=0$, $\Delta_{TF}(i)=0$;
wherein $K_S$ is a parameter configured by radio resource control at a high layer;
wherein MPR=O/$N_{RE}$, where $N_{RE}$ represents the number of resource elements, $N_{RE}=M_{PUSCH} \cdot N_{sc}^{RB} \cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access symbols used for transmitting the PUSCH, $N_{sc}^{RB}$ represents the number of resource elements contained in a resource block, O represents the size of information bits, and $\Delta\beta$ represents the amplitude offset;

wherein when there is only uplink control information but no uplink shared channel data sent over the physical uplink shared channel, $O=O_{CQI}$, and when $\Delta_{TF}(i)=10\cdot\log_{10}\{(2^{MPR\cdot K_S}-1)\cdot\Delta\beta\}$, $\Delta\beta=\beta_{offset}^{CQI}$, or when $\Delta_{TF}(i)=10\cdot\log_{10}(2^{MPR\cdot K_S}-1)+\Delta\beta$, $\Delta\beta=10\cdot\log_{10}\beta_{offset}^{CQI}$, where $O_{CQI}$ represents the total number of bits contained in the channel quality indication signaling and its corresponding cyclic redundancy check, $\beta_{offset}^{CQI}$ represents an amplitude offset of channel quality indication information, and $M_{PUSCH}$ is obtained according to a signaling in an initial PDCCH of a transmission block.

3. The method according to claim 2, wherein the $\beta_{offset}^{CQI}$ is notified by a high layer signaling.

4. The method according to claim 2, wherein the value of the $\beta_{offset}^{CQI}$ is 0.750, 1.000, 1.125, 1.250, 1.375, 1.625, 1.750, 2.000, 2.250, 2.500, 2.875, 3.125, 3.500, 4.000, 5.000 or 6.250.

5. The method according to claim 2, wherein when there is only uplink shared channel data sent over the physical uplink shared channel, or when there are both uplink control information and uplink shared channel data sent over the physical uplink shared channel, O=TBS, when $\Delta_{TF}(i)=10\cdot\log_{10}\{(2^{MPR\cdot K_S}-1)\cdot\Delta\beta\}$, $\Delta\beta=1$, or when $\Delta_{TF}(i)=10\cdot\log_{10}(2^{MPR\cdot K_S}-1)+\Delta\beta$, $\Delta\beta=0$, where TBS represents the size of a transmission block, and TBS and $M_{PUSCH}$ are obtained according to the signaling in the initial PDCCH of the transmission block.

6. The method according to claim 2, wherein when there is only uplink shared channel data sent over the physical uplink shared channel, O=TBS, when $\Delta_{TF}(i)=10\cdot\log_{10}\{(2^{MPR\cdot K_S}-1)\cdot\Delta\beta\}$, $\Delta\beta=1$, or when $\Delta_{TF}(i)=10\cdot\log_{10}(2^{MPR\cdot K_S}-1)+\Delta\beta$, $\Delta\beta=0$, where TBS represents the size of a transmission block, and TBS and $M_{PUSCH}$ are obtained according to a signaling in a most recent PDCCH related to the transmission block.

7. The method according to claim 2, wherein when there is only uplink shared channel data sent over the physical uplink shared channel, or when there are both uplink control information and uplink shared channel data sent over the physical uplink shared channel, $$O = \sum_{r=0}^{C-1} K_r;$$

when $\Delta_{TF}(i)=10\cdot\log_{10}\{(2^{MPR\cdot K_S}-1)\cdot\Delta\beta\}$, $\Delta\beta=1$, or when $\Delta_{TF}(i)=10\cdot\log_{10}(2^{MPR\cdot K_S}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to the signaling in the initial PDCCH of the transmission block.

8. The method according to claim 2, wherein when there is only uplink shared channel data sent over the physical uplink shared channel, $$O = \sum_{r=0}^{C-1} K_r$$

when $\Delta_{TF}(i)=10\cdot\log_{10}\{(2^{MPR\cdot K_S}-1)\cdot\Delta\beta\}$, $\Delta\beta=1$, or when $\Delta_{TF}(i)=10\cdot\log_{10}(2^{MPR\cdot K_S}-1)+\Delta\beta$, $\Delta\beta=0$, where C represents the total number of coding blocks, $K_r$ represents the number of bits contained in a coding block with an index of r, and the $M_{PUSCH}$, C and $K_r$ are obtained according to a signaling in a most recent PDCCH related to the transmission block.

9. The method according to claim 1, wherein the uplink control information includes: Acknowledge (ACK), and/or Non-Acknowledge (NACK), and/or Rank Indication (RI), Channel Quality Indication (CQI), and/or Precoding Matrix Indicator (PMI).

10. A transmission power control system for a physical uplink shared channel, including a power setting module, used for setting the transmission power of the physical uplink shared channel according to the total number of bits contained in a channel quality indication signaling and its corresponding cyclic redundancy check as well as an amplitude offset, when there is only uplink control information but no uplink shared channel data sent over the physical uplink shared channel.

11. The system according to claim 10, wherein the power setting module is used for setting the transmission power of the physical uplink shared channel according to the following formula:

$$P_{PUSCH}(i)=\min\{P_{MAX}, 10\cdot\log_{10}(M_{PUSCH}(i))+P_{O\_PUSCH}(j)+\alpha\cdot PL+\Delta_{TF}(i)+f(i)\},$$

where $P_{MAX}$ represents an upper limit of transmission power;

$M_{PUSCH}(i)$ represents bandwidth used for transmitting the physical uplink shared channel in subframe i;

$P_{OPUSCH}(j)$ represents target reference power;

$\alpha$ represents a path loss correction factor;

PL represents path loss;

f(i) represents a power control correction function of subframe i;

$\Delta_{TF}(i)$ is a transmission format offset parameter;

when $K_S=1.25$, , $\Delta_{TF}(i)=10\cdot\log_{10}\{(2^{MPR\cdot K_S}-1)\cdot\Delta\beta\}$, or $\Delta_{TF}(i)=10\cdot\log_{10}(2^{MPR\cdot K_S}-1)+\Delta\beta$;

when $K_S=0$, $\Delta_{TF}(i)=0$;

wherein $K_S$ is a parameter configured by radio resource control at a high layer;

wherein $MPR=O/N_{RE}$, where $N_{RE}$ represents the number of resource elements, $N_{RE}=M_{PUSCH}\cdot N_{sc}^{RB}\cdot N_{symb}^{PUSCH}$, where $M_{PUSCH}$ represents the bandwidth used for transmitting the physical uplink shared channel, $N_{symb}^{PUSCH}$ represents the number of single carrier-frequency division multiple access signals used for transmitting the PUSCH, $N_{sc}^{RB}$ represents the number of resource elements contained in a resource block, O represents the size of information bits, and $\Delta\beta$ represents the amplitude offset;

wherein when there is only uplink control information but no uplink shared channel data sent over the physical uplink shared channel, $O=O_{CQI}$, and when $\Delta_{TF}(i)=10\cdot\log_{10}\{(2^{MPR\cdot K_S}-1)\cdot\Delta\beta\}$, $\Delta\beta=\beta_{offset}^{CQI}$, or when $\Delta_{TF}(i)=10\cdot\log_{10}(2^{MPR\cdot K_S}-1)+\Delta\beta$, $\Delta\beta=10\cdot\log_{10}\beta_{offset}^{CQI}$, where $O_{CQI}$ represents the total number of bits contained in the channel quality indication signaling and its corresponding cyclic redundancy check, $\beta_{offset}^{CQI}$ represents an amplitude offset of channel quality indication information, and $M_{PUSCH}$ is obtained according to a signaling in an initial PDCCH of a transmission block.

12. The system according to claim 11, wherein the power setting module is use for obtaining the $\beta_{offset}^{CQI}$ from a high layer signaling.

13. The system according to claim 11, wherein the power setting module is used for determining values of the O and $\Delta\beta$ in the following way when there is only uplink shared channel data sent over the physical uplink shared channel, or when there are both uplink control information and uplink shared channel data sent over the physical uplink shared channel: O=TBS, when $\Delta_{TF}(i)=10\cdot\log_{10}((2^{MPR\cdot Ks}-1)\cdot\Delta\beta)$, $\Delta\beta=1$, or when $\Delta_{TF}(i)=10\cdot\log_{10}(2^{MPR\cdot Ks}-1)+\Delta\beta$, $\Delta\beta=0$, where TBS represents the size of a transmission block, and TBS and $M_{PUSCH}$ are obtained according to the signaling in the initial PDCCH of the transmission block.

14. The system according to claim 11, wherein the power setting module is used for determining values of O and $\Delta\beta$ in the following way when there is only uplink shared channel data sent over the physical uplink shared channel: O=TBS, when $\Delta_{TF}(i)=10\cdot\log_{10}((2^{MPR\cdot Ks}-1)\cdot\Delta\beta)$, $\Delta\beta=1$, or when $\Delta_{TF}(i)=10\cdot\log_{10}(2^{MPR\cdot Ks}-1)+\Delta\beta$, $\Delta\beta=0$, where TBS represents the size of a transmission block, and TBS and $M_{PUSCH}$ are obtained according to a signaling in a most recent PDCCH related to the sent transmission block.

15. The system according to claim 11, wherein the power setting module is used for determining values of O and $\Delta\beta$ in the following way when there is only uplink shared channel data sent over the physical uplink shared channel, or when there are both uplink control information and uplink shared channel data sent over the physical uplink shared channel:

$$O = \sum_{r=0}^{C-1} K_r,$$

when $\Delta_{TF}(i)=10\cdot\log_{10}((2^{MPR\cdot Ks}-1)\cdot\Delta\beta)$, $\Delta\beta=1$, or when $\Delta_{TF}(i)=10\cdot\log_{10}(2^{MPR\cdot Ks}-1)+\Delta\beta$, $\Delta\beta=0$, where C represents the total number of coding blocks, $K_r$ represents the number of bits contained in a coding block with an index of r, and $M_{PUSCH}$, C and $K_r$ are obtained according to the signaling in the initial PDCCH of the transmission block.

16. The system according to claim 11, wherein the power setting module is used for determining values of O and $\Delta\beta$ in the following way when there is only uplink shared channel data sent over the physical uplink shared channel:

$$O = \sum_{r=0}^{C-1} K_r,$$

when $\Delta_{TF}(i)=10\cdot\log_{10}((2^{MPR\cdot Ks}-1)\cdot\Delta\beta)$, $\Delta\beta=1$, or when $\Delta_{TF}(i)=10\cdot\log_{10}(2^{MPR\cdot Ks}-1)+\Delta\beta$, $\Delta\beta=0$, where C represents the total number of coding blocks, $K_r$ represents the number of bits contained in a coding block with an index of r, and $M_{PUSCH}$, C and $K_r$ are obtained according to a signaling in a most recent PDCCH related to the transmission block.

17. The method according to claim 3, wherein the value of the $\beta_{offset}^{CQI}$ is 0.750, 1.000, 1.125, 1.250, 1.375, 1.625, 1.750, 2.000, 2.250, 2.500, 2.875, 3.125, 3.500, 4.000, 5.000 or 6.250.

18. The method according to claim 2, wherein the uplink control information includes: Acknowledge (ACK), and/or Non-Acknowledge (NACK), and/or Rank Indication (RI), Channel Quality Indication (CQI), and/or Precoding Matrix Indicator (PMI).

* * * * *

UNITED STATES PATENT AND TRADEMARK OFFICE
CERTIFICATE OF CORRECTION

PATENT NO.       : 8,521,210 B2
APPLICATION NO. : 12/991352
DATED            : August 27, 2013
INVENTOR(S)      : Dai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this

Fifteenth Day of September, 2015

Michelle K. Lee
*Director of the United States Patent and Trademark Office*